United States Patent
Köppendörfer et al.

(10) Patent No.: US 11,009,415 B2
(45) Date of Patent: May 18, 2021

(54) DEVICE HAVING A SUPPLY LINE WITH A SENSOR LINE FOR TORSION MEASUREMENT AND THE METHOD THEREOF

(71) Applicant: LEONI Kabel GmbH, Roth (DE)

(72) Inventors: Erwin Köppendörfer, Schwabach (DE); Johannes Nachtrab, Windsbach (DE)

(73) Assignee: LEONI Kabel GmbH, Roth (DE)

( * ) Notice: Subject to any disclaimer, the term of this patent is extended or adjusted under 35 U.S.C. 154(b) by 159 days.

(21) Appl. No.: 16/307,210

(22) PCT Filed: Jun. 9, 2017

(86) PCT No.: PCT/EP2017/064122
§ 371 (c)(1),
(2) Date: Dec. 5, 2018

(87) PCT Pub. No.: WO2017/216060
PCT Pub. Date: Dec. 21, 2017

(65) Prior Publication Data
US 2019/0178735 A1    Jun. 13, 2019

(30) Foreign Application Priority Data
Jun. 15, 2016   (DE) .................. 10 2016 210 603.1

(51) Int. Cl.
*G01L 5/10*     (2020.01)
*G01L 3/22*     (2006.01)
(Continued)

(52) U.S. Cl.
CPC ........... *G01L 5/226* (2013.01); *B25J 19/0025* (2013.01); *G01L 3/22* (2013.01); *G01L 5/10* (2013.01)

(58) Field of Classification Search
None
See application file for complete search history.

(56) References Cited

U.S. PATENT DOCUMENTS 4,130,014 A * 12/1978 Eddens ............... G01L 5/10
                                                73/862.382
5,277,072 A *  1/1994 Ort .................... B65H 59/40
                                                73/862.632
(Continued)

FOREIGN PATENT DOCUMENTS

CN      1484750 A    3/2004
CN    101728005 A    6/2010
(Continued)

OTHER PUBLICATIONS

First Office Action for corresponding Chinese application No. 201780031726.3; dated Mar. 13, 2020; 10 pages (Machine Translation).
(Continued)

*Primary Examiner* — Peter J Macchiarolo
*Assistant Examiner* — Jermaine L Jenkins
(74) *Attorney, Agent, or Firm* — Mendelsohn Dunleavy, P.C.; Steve Mendelsohn

(57) ABSTRACT

The invention relates to a device (2). Said device has two machine parts (4, 6) that are movable relative to one another and are connected to each other by a supply line (8) along which a sensor line (10) is mounted for measuring torsion of the supply line (8); the sensor line (10) is connected to a measurement unit (11) which is designed in such a way that an electrical parameter (P) of the sensor line (10) is measured, the torsion being ascertained using said parameter (P). The invention further relates to a corresponding supply line (8), a sensor line (10) and a torsion measurement method.

13 Claims, 2 Drawing Sheets

Figure 1:
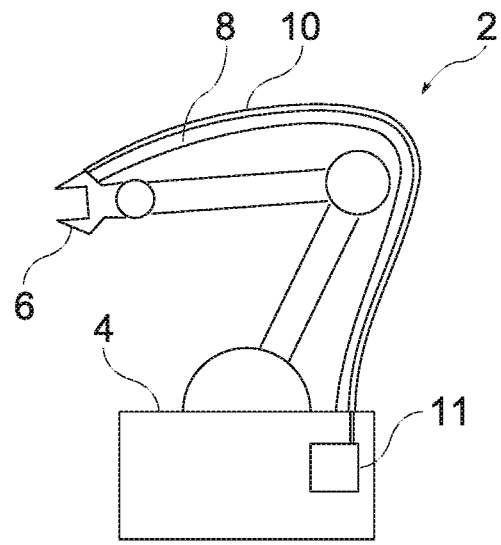

(51) Int. Cl.
*G01L 5/22* (2006.01)
*B25J 19/00* (2006.01)

(56) References Cited

U.S. PATENT DOCUMENTS

| | | | |
|---|---|---|---|
| 5,365,797 A * | 11/1994 | McCrory, III | G01L 5/10 |
| | | | 73/862.391 |
| 6,563,107 B2 | 5/2003 | Danisch et al. | |
| 9,400,221 B2 * | 7/2016 | Sarchi | G01L 1/242 |
| 9,579,806 B2 * | 2/2017 | Sussman | B25J 19/0025 |
| 10,663,360 B2 * | 5/2020 | Ibrocevic | G01L 1/26 |
| 2006/0196252 A1 * | 9/2006 | Deckard | F16L 25/01 |
| | | | 73/49.5 |
| 2010/0081969 A1 | 4/2010 | Ihrke et al. | |
| 2010/0105992 A1 | 4/2010 | Oda et al. | |
| 2012/0065902 A1 | 3/2012 | Nakajima | |
| 2012/0277531 A1 * | 11/2012 | Krattiger | G01B 7/18 |
| | | | 600/117 |

FOREIGN PATENT DOCUMENTS

| | | |
|---|---|---|
| CN | 102460606 A | 5/2012 |
| DE | 10324919 A1 | 1/2004 |
| DE | 202005005869 U1 | 9/2005 |

OTHER PUBLICATIONS

International Search Report and Written Opinion; dated Sep. 29, 2017 for PCT/EP2017/064122.
Notification of Grant for corresponding Chinese application No. 201780031726.3; dated Feb. 4, 2021 (6 pages).

* cited by examiner

DEVICE HAVING A SUPPLY LINE WITH A SENSOR LINE FOR TORSION MEASUREMENT AND THE METHOD THEREOF

The invention relates to a device, a supply line for such a supply line, as well as a sensor line and a method for measuring the torsion of the supply line.

A supply line is used for connecting two machine parts and for transmitting energy, signal and/or working media between both machine parts. The two machine parts are often movable relative to one another, so that the supply line is exposed in particular to conflicting mechanical loads, in particular torsional loads, but also for example to bending loads. Particularly high requirements with respect to flexibility of such a supply line are encountered in the area of robots, for example robot arms used in production. Supply lines are also potentially exposed to very high requirements also in the automotive field.

A critical factor is in this case that the supply line tolerates only a certain degree of deformation depending on the construction, in particular torsion, and there is a danger of functional failure in case of an overload. In principle, it is possible to guide the supply line with forced control via a rigid guide contour or with a mechanism limiting the movement, which is to say so as to provide guidance only along a predetermined path and limit the movement to certain fixed points, for example rotational points. The torsional load can then be measured by means of conventional sensors measuring torsional load. However, the occasionally regular change in position and repeated deformation of the supply line is particularly complex in the areas of the applications mentioned in the introduction and a high degree of variability is often required. A detection of the torsional load, however, is not possible in the case of positively-guided supply lines with conventional sensors.

Against this background, an object of this invention is to enable a reliable monitoring or measuring of the torsion with devices such as those claimed, in particular with non-positively guided supply lines. For this purpose, a device having a supply line is to be specified, having a torsion that can be measured and that is measured as simply as possible. The supply line itself should be movable as freely as possible. In addition, a torsional measurement should be carried out in particular not only very precisely, but also while taking into account the entire supply line. The invention further relates also to a corresponding supply line and to a sensor line and a method for measuring the torsion of the supply line.

The object is achieved according to the invention with a device having the features according to claim 1. Furthermore, the object is achieved with a supply line having the features according to claim 11, with a sensor line provided with the features according to claim 12 and with a method having the features according to claim 13. Preferred embodiments, further developments and variants are the subject matter of the dependent claims. At the same time, the explanations relating to the device also apply as appropriate to the sensor line, the sensor line and the method, and vice versa.

The device is generally provided with two machine parts, which are movable relative to one another and which are connected to one another by means of a supply line. The supply line itself usually has a number of supply strands, which is to say one or more supply strands, by means of which one of the two machine parts is supplied. At the same time, the sensor line is connected to a measurement unit which is designed to measure the torsion of the supply line, i.e. for measuring a torsion of the supply axis about a (central) longitudinal axis thereof At the same time, the sensor line is designed in such a way so that an electrical parameter of the sensor line is measured and so that the torsion is at least inferred by means of the parameter.

Therefore, a characteristic variable is derived from the measured value of the characteristic variable for the current torsion load and the torsion is thus determined at least indirectly. In this case, in particular the torsion of the supply line is determined along its total length between the two machine parts.

The invention is based in particular on the observation that a torsional measurement is conventionally carried out only at certain points by attaching a torsion sensor. The supply line must then be for example forcibly guided, so as to be loaded in a specific manner so that a measurement of the torsion can be performed at certain fixed points. As an alternative, a correspondingly large number of sensors would need to be arranged along the supply line, which makes the measurement particularly complex from the viewpoint of the design. On the other hand, it has been found that the electrical characteristics of a line with a suitable construction change during a movement and/or deformation occur in a measurable manner, so that such a line can be advantageously used as a sensor line. An essential advantage of the invention is thus in particular that special torsion sensors can be avoided and a suitable sensor line is used instead as a torsion sensor. This means that the sensor line is not a supply line leading to a sensor, but the line itself is a sensor, more precisely a torsion sensor. The torsion is thus detected by means of the sensor line not at certain points, but over larger longitudinal sections, typically measuring from multiples of 10 cm to several meters, in particular over the entire length of the sensor line.

The sensor line is arranged along the supply line and it is connected to it so that the sensor line is thus subject to the same or at least to similar loads as the supply line. By measuring the electrical parameters, which is to say one of the electrical characteristics of the sensor line, the electrical properties of the sensor line itself are therefore determined in a very simple manner with the actual deformation of the sensor line and the deformation of the supply line is thus measured. At the same time, the course of the entire sensor line is inherently taken into account and accordingly, so is also a longer and in particular a continuous section of the supply line.

It is preferred when the sensor line runs along the entire supply line, so that the torsion thereof is measured as a whole. However, as an alternative, the torsion can be measured only in sections and the sensor line is then connected for this purpose only in sections along the supply line.

The sensor line is a part of the supply line and it is mechanically connected to it. In particular, it forms together with the individual supply strands of the supply lines a composite cable, which is preferably surrounded by a common outer jacket.

In particular, the torsions can be measured in a region that is greater than one torsion of the supply line about its longitudinal axis by means of the sensor line per a running meter of the supply line, up to 20 revolutions per meter. In principle, however, fewer or more revolutions can be measured with the sensor line described here. The measuring range is determined above all by the specific design and dimensioning of the sensor line. With a suitable adjustment of the sensor line, it is thus possible to adapt the torsion measurement in an optimal manner to the present application.

It is preferred when the sensor line is designed to be mechanically robust, for multiple measurements of the torsion, in particular of a critical torsion, which should not be exceeded. Under the term "mechanically robust" is understood in particular that the sensor line does not break in the event of a torsional stress. Accordingly, the sensor line is not designed as a sacrificial line, but as a mechanically robust sensor line. An essential advantage is in particular that the sensor line does not need to be designed as the weakest member of the supply line, which breaks down with a certain amount of the load and thus indicates a certain torsional stress. Instead, the sensor line can be advantageously used several times in order to detect a certain torsional stress.

The supply line serves primarily for transmitting energy, signals and/or working media between the two machine parts. The individual supply strands of the supply line are therefore chosen selectively or in any combination depending on the applications as a power cable for supplying power for the machine parts, a data cable, a hose, for example a hydraulic or a pneumatic hose for supplying to the machine part a hydraulic fluid, an operating means or a lubricant, or a gas with compressed air. A hybrid cable or a cable harness can be also used for supply strands. The supply strands are usually surrounded by a tube, in particular in the fields of robotics, and they form a tube bundle. The machine parts do not necessarily have to be additionally bundled together, but they can be for example connected to one another via a joint. The machine parts are for example two parts of a robot, for example a base and a manipulator movable relative thereto. The supply line supplies in this manner to the manipulator for example energy and control signals. In one variant, both machine parts relate to a vehicle, and they are in particular an electrical charging station so that the supply line is a charging cable for supplying electrical energy to an energy store of the vehicle.

In general, the two machine parts are movable relative to one another, so that one torsion, i.e. a rotation of the supply line, is carried out or is at least possible. In particular, the torsion is measured continuously or in regular intervals within the context of online monitoring. Based and depending on the measured torsion, for example a warning signal is output if the supply line is rotated beyond a predetermined limit. Alternatively or additionally, the measured torsion is used for a wear signal profile, which is to say that the torsion is measured regularly and in particular stored in a memory of the measuring unit in order to monitor the actual usage and thus also the wear of the supply line.

The measurement of the electrical parameter of the sensor line is essential for the determination of the torsion. A characteristic variable of this parameter is that the latter changes as a function of a torsion of the sensor line.

Since the sensor line is mechanically coupled with the supply line, a preferably identical torsion of the sensor line is also obtained as a result. The latter in turn has certain transmission features which are characterized by the parameter. The change of the parameter therefore corresponds in particular to a change of the transmission characteristics of the sensor line, i.e. a measurement is carried out by measuring the parameters. It is therefore expedient when an electrical test signal is applied or supplied therein and the transmission characteristics are determined on the basis of the change of the test signal. The measuring unit measures the parameter and also preferably evaluates the measurement, for example by comparing it to previously measured value of the parameter. The measuring unit then in the end determines with the measurement of the parameter the torsion of the sensor line and thus also the torsion of the supply line.

The principle of measuring the torsional load of the supply line is thus generally based on the fact that as a result of the integration of the sensor line in the supply line, the sensor line is also subject to a torsional stress, which leads to a mechanical change in the structure of the sensor line, so that the transmission characteristics change for a (sensor) signal that is transmitted through the sensor line, and which thus leads to a change of the characteristics of the signal. Based on this characteristic change in the signal, the torsional load is then inferred by means of the conclusions of the measuring unit.

In order to measure the torsion, the sensor line is provided in a preferred embodiment with two conductors which are respectively designed as stranded wires and which are connected to one another in the direction opposite to the direction of impact. In this case, the measuring unit is constructed in such a way that one of the respective conductors is measured as a parameter of signal attenuation. This design is in particular based on the recognition that a change in the signal attenuation in the event of a torsion is in the case of a stranded wire dependent on a change of the signal attenuation based on the length of the stranded conductor which has been selected during the stranded connection. In general, the signal attenuation of a conductor increases in particular towards high frequencies, because the current is forced outwards and due to the skin effect and the effective conducting cross-section of the conductor, it is therefore reduced. As a result, the electrical resistance is increased and a corresponding loss is obtained. In addition, with a conductor provided with stranded conductors which consist of a plurality of individual wires connected to one another, the current must additionally overcome a plurality of transition resistances between individual wires. The attenuation is thus dependent on the lay length and in particular also on the number of the wires. A conductor with a smaller lay length and otherwise the same design then has an increased signal attenuation.

Moreover, the signal attenuation is also dependent on the distance between the individual wires. The signal attenuation is greater with a wire connection that is more loose or relaxed. This effect is advantageously used in the present case for measuring the torsion. With a torsion of the sensor line, the individual conductors are wound up or arranged closer together depending on the direction of the rotation of the torsion, as a result of which, the signal attenuation changes and the test signal which is propagated through the conductor is influenced accordingly. In particular, the amplitude of the test signal is in this case reduced, wherein the extent of the amplitude change is dependent on the torsion.

Particularly advantageous is the use of two twisted stranded conductors which are connected inversely, which is to say that the individual wires are stranded in one conductor in direction S and in the other conductor in Z direction. A conductor pair is thus formed in which the two conductors are influenced differently in a specific direction in the event of torsion. This is because one conductor is loosened, which is to say that its length of lay is increased, while the other conductor is tightened, which is to say that its lay length is reduced; while in the case of torsion in the reverse direction, it is appropriately the other way round. A torsion can thus be determined equally well in both directions.

Another advantage of using a conductor pair as opposed to a single conductor is in particular that a reference point is defined in particular as the position in which both conductors have the same signal attenuation and in which the supply line is torsion-free. In principle, however, in this case it is possible in one variant to use a certain position with a pre-torsion as a reference point.

Preferably, the two conductors differ only in the direction of the impact and otherwise are designed in the same manner, which is to say that they are in particular provided with the same diameter, and with the same number of individual wires as well as the impact length, and they are also manufactured from the same material.

It is preferred when the measuring unit is designed in such a way that both signal attenuations are compared to one another and the torsion is determined as a function of a difference between both attenuations. For this purpose, each signal attenuation of the conductors is measured and the difference between them is in particular formed, which is to say that a signal attenuation difference is determined. The strength and the direction can then be advantageously determined on this basis, wherein the direction is in particular determined by the sign of the difference.

The measuring unit is in one embodiment designed in such a way that the parameter is measured, wherein a test signal is fed into each of the conductors, in particular at one end, and measured after propagation through the conductor. The test signal is in this case a high-frequency signal and it has a frequency in the range from 10 to 100 MHz, preferably 50 to 100 MHz. Since the signal attenuation is stronger with higher frequencies, the use of a signal with the highest possible frequency is correspondingly advantageous. The test signal is for example a sinus signal with a corresponding frequency, or alternatively a signal that is formed differently, having a frequency which contains at least one correspondingly high frequency.

It is essential that when the test signal is fed in, this signal has in particular passed prior to the measurement at least once the section of the sensor line to be examined. In other words: the test signal can be in principle fed in at any desired point as long as a propagation takes place through the section whose torsion is to be determined. However, it is expedient when the signal is fed into the conductor at the end in order to use as much as possible the entire length of the sensor line.

Preferably, a general transmission measurement is carried out, which is to say that the test signal is supplied at one end of the sensor line and a measurement of the test signal takes place on the other end of the sensor line. As an alternative, a reflection measurement is also a possibility, in particular at the location where the signal is fed in. In principle, measurement by means of a network analyzer, abbreviated as VNA, or by means of time division reflectometry, abbreviated as TDR is also possible. However, both of these solutions are complex and expensive.

In a preferred embodiment, the test signal is an impulse, in particular a square-wave signal. Such a signal is characterized by a particularly large edge steepness and it thus has a frequency spectrum provided in particular with high-frequency components, namely in particular multiples of the repetition rate of the impulse. It is advantageous when a digital test signal is used with a data rate in the range from 1 to 20 Gbits. Although such a digital test signal has a repetition rate corresponding only to 1 to 20 Ghz, corresponding harmonics result in multiples of the repetition rate due to the rectangular form.

The measuring unit is provided with a suitable evaluation circuit used in order to determine the torsion on the basis of the measured signal attenuation. Both analog and digital approaches are suitable for this purpose. In a particularly simple embodiment, the two measured signal attenuations are compared by means of an operational amplifier which then outputs the difference as a voltage value. This is converted, for example via a table into a torsion of the supply line in degrees or revolutions per meter, or used directly as a value for the torsion.

The measurement of the signal attenuation does not necessarily have to be carried out at a single frequency. In a suitable variant, the signal attenuation is determined for example by integration over s suitable frequency range. For this purpose, for example a suitable capacitor is connected downstream of the above-mentioned operational amplifier so that the operational amplifier is correspondingly integrated over a suitable frequency range.

The two connectors form in general a transmission pair for the sensor signal. In general, the respective conductors are surrounded by an insulation jacket and they in each case in particular form a core. The transmission pair is arranged in a suitable manner with respect to each other with regard to the transmission of the sensor signal which should be as undisturbed as possible. The transmission pair can be generally designed as twisted or non-twisted pair, as well as without pair shielding.

According to a first variant, the two cores extend parallel to each other. Alternatively, both cores are in a preferred embodiment stranded together, which is to say that the conductor pair itself has an impact length. With these measures, the two conductors are held in a defined manner with respect to each other. In the case of a stranding without a so-called reverse rotation, respective cores and thus also each conductor are additionally rotated in this manner. Accordingly, the core pair reduces or increases with the stranding of the core pair the impact length of individual conductors as a function of the direction of the impact. The signal attenuation is correspondingly influenced also in this case. In the direction opposite the impact direction of the stranded compared direction, the impact length of the conductor is increased compared to the impact direction of the stranded pair; however, the individual wires are also compressed to a lesser extent, so that the loss in the conductor, i.e. a signal attenuation, is in this case increased overall and it is greater when compared to an embodiment with identical impact directions. Against this background, it is particularly advantageous, in particular with the integration of the sensor line in the supply line, when the sensor line can be stranded with reverse rotation in order to avoid a pre-torsion. It is preferred when the torsion applied with the additional stranding of the pair is fully compensated for with reverse rotation. In principle, however, such a pre-torsion can be also taken into account in particular in the context of the evaluation of the measured parameter.

The transmission characteristics of the pair of conductors are in particular influenced not only by the torsion, but usually also by the distance of the conductors from one another. In order to enable a measurement of the torsion that is as precise as possible, the distance between the two conductors is in a preferred embodiment fixed. For this purpose is suitable for example the pair stranding mentioned above and/or a pair shielding, by means of which the conductors are held in a defined manner.

In a preferred embodiment, both conductors expediently embedded together in a profile made of insulating material and spaced from each other at a fixed distance. The insulating material forms in particular at the same time a common jacket or a cable sheath of both conductors. Suitable materials are in particular plastic materials, for example PE, PP, PVC or PA. It is preferred when the material is as little elastic as possible, at least in the region between both conductors, so that the distance remains unchanged as much as possible with a mechanical load on the conductor pair. For example, the profile is provided with a web which is arranged between both conductors. The web is preferably made of a hard material.

In a preferred embodiment, both conductors are respectively designed as coaxial conductors, which is to say that they are individually provided with a shielding. The transmission properties are thus defined in this manner and interfering influences from the environment are thus effectively shielded.

In order to protect the conductors as a whole unit against environmental influences, in particular to protect them against electrical interference, the two conductors are respectively formed in a suitable embodiment surrounded by a common shielding.

As a result, the conductors of the sensor line are advantageously also shielded in an integrated system with the supply line against other conductors of the supply line.

For the design of the sensor line can be generally used a conventional configurations of data lines—while taking into account the requirements above for the desired evaluation of the torsion load. The sensor line can be also integrated into a (data) conductor system, for example into a (quadruple) stranded network. In addition, it is also possible to use the sensor line also for an additional data transmission and/or for transmission of a supply voltage or electrical power. In the latter case, the sensor signal is for example modulated signal.

Figure 2:
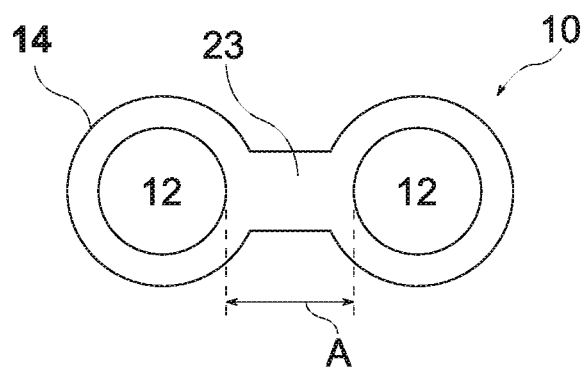
Figure 3:
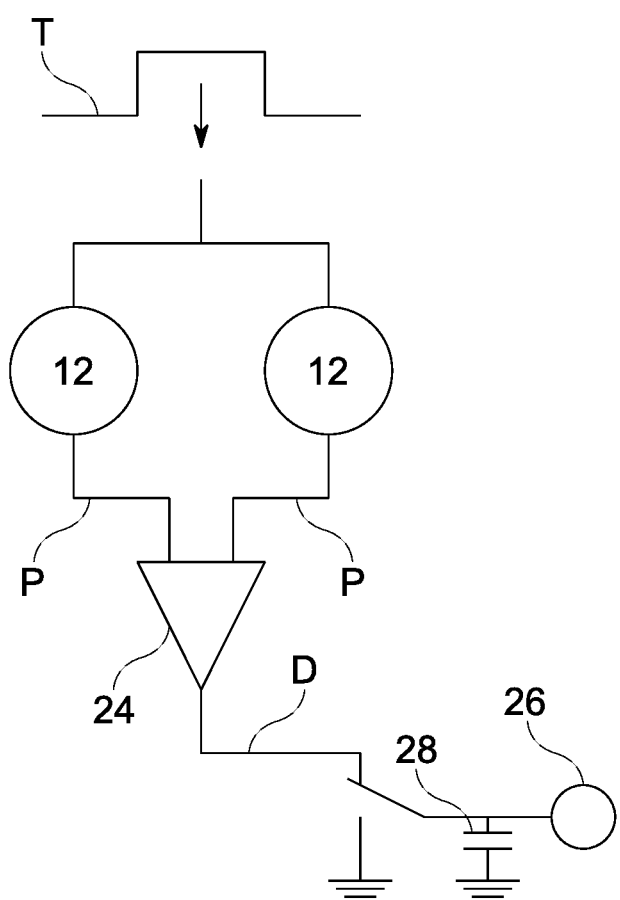

Embodiments of the invention will be explained next in more detail with reference to a figure. The figures show schematically the following:

FIG. 1 a device with a supply line and a sensor line,
FIG. 2 a sensor line, and
FIG. 3 a measuring unit.

FIG. 1 shows a device which is here a robot. The device is provided with two machine parts 4 and 6, here, a base 4 and a manipulator 6. The machine parts 4, 6 are connected to each other by means of a supply line 8. They are usually provided for transmission of energy, data, signal and/or working media, in particular with a plurality of different type of supply strands, not shown in the figure, in the form of electric or pneumatic lines, etc. As shown in FIG. 1, for example control signals are transmitted by means of the supply line 8 from the basis 4 to the manipulator 8. In a variant not show in the figure, both machine parts 4, 6 are for example an automobile and an electrical charging station and the supply line 8 is a charging cable for charging an energy storage device of the vehicle.

The machine parts 4, 6 are mutually movable relative to one another and, accordingly, the supply line 8 should therefore be as flexible as possible. This results under some conditions in complex mechanical loads on the supply line 8, in particular also a torsion, which is to say twisting. The torsion of the supply line 8 is determined by means of a sensor line 10, which is a part of the supply line 8 and thus mechanically coupled to the supply strands. The sensor line 10 is also correspondingly rotated in the event of a torsion of the supply line. The sensor line 10 is preferably surrounded together with the other supply strands by a joint outer jacket of the supply line 8, or alternatively attached also externally to such an outer jacket, or attached to a supply line.

The sensor line 10 itself serves as a sensor, in particular as a torsion sensor, so that a torsion can be determined between the two machine parts 4, 6 not only selectively, but along the entire supply line. The sensor line 10 has transmission properties which are a function of the sensor line 10. These transmission properties are characterized by at least one electrical parameter P, which is measured with the measuring unit 11. For this purpose, one test signal T is fed into the sensor line 10 and measured by means of the measuring unit 11, so that the change of the test signal T is in particular examined based on the changed transmission features.

FIG. 2 shows an embodiment of the sensor line 10 in a cross-section perpendicular to the longitudinal direction of the sensor line 10. The sensor line is equipped with two conductors 12, by means of which the measurement of the torsion is carried out.

In the embodiment of FIG. 2, the conductors 12 are together embedded in a profile 14, which in this case serves at the same time as an insulating jacket. Both conductors 12 are arranged at a distance A from one another, wherein the distance A is maintained as constant as possible by means of the profile 14, preferably also in the event of a torsion, so that an influence on the transmission features by a change of the distance is minimized.

For this purpose, the profile 14 is provided with a web 23, which is arranged between the conductors 12 and preferable made of a hard material.

The principle on which the measuring in FIG. 2 is based uses the respective signal attenuations of the two conductors 12 as electrical parameter P. The conductors 12 are for this purpose respectively constructed as mutually stranded conductors, which is to say that they are made of several stranded individual wires. At the same time, both conductors 12 are stranded in the opposite direction to the direction of impact, which is to say that one conductor 12 is stranded in direction S, and the other in direction Z. In the event of a torsion, one conductor 12 is loosened and the other one is tightened, so that the signal attenuations are correspondingly changed in the two conductors 12 in opposite directions. Both signal attenuations are measured together by the measuring unit 11 and compared to one another. After that, the strength and the direction of the torsion are determined.

FIG. 3 shows a detail of a measurement device 11 which is used for measuring and comparing the signal attenuations, i.e. the parameter P of the conductor 12. A test signal T, which is fed respectively into the two conductors 12, is propagated along the conductor 12 and measured as an electric parameter P. The two measured signal attenuations are here compared by means of an operational amplifier 24. The difference D is measured by means of a voltage-measurement device 26 and output as a value for the torsion. As an alternative, the torsion is determined by means of a table based on the difference D. When using an operational amplifier 24, problems can occur under some circumstances during the measurement due to phase shifting. Therefore, it is expedient to ignore phases during the measurement and only compare amplitudes with one another.

The test signal T is in FIG. 3 a digital, rectangular signal, which is characterized by a frequency spectrum with particularly high-frequency components. Such a test signal T is particularly suitable for measuring the signal attenuations because they increase toward high frequencies. Due to the rectangular form, correspondingly high-frequency harmonics can be found in the frequency spectrum of the test signal T, which are attenuated particularly strongly and enable a simple measurement.

For integration over a certain frequency range, the measuring unit 11 is here additionally provided with a capacitor 28. Alternatively, the capacitor can be omitted.

The invention claimed is:

1. Device with comprising two machine parts movably connected to each other by a supply line, wherein the supply line is provided with a sensor line for measurement of torsion of the supply line, wherein the sensor line is connected to a measuring unit designed to measure an electrical parameter of the sensor line and the torsion is inferred from the measured electrical parameter, wherein the sensor line is provided with two stranded conductors that are stranded in mutually opposite impact directions, and wherein the measuring unit is designed to measure a signal attenuation for each stranded conductor.

2. The device according to claim 1, characterized in that the measuring unit is designed to determine the torsion as a function of a difference between the two signal attenuations.

3. The device according to claim 1, characterized in that the measuring unit is designed to measure each signal attenuation after a test signal is fed into and propagates through the corresponding stranded conductor.

4. The device according to claim 3, characterized in that each test signal is an impulse.

5. The device according to claim 1, characterized in that the sensor line is designed with a mechanically robust construction for multiple measurements of torsion.

6. The device according to claim 1, characterized in that the two stranded conductors are surrounded by an insulating jacket and stranded together, wherein the torsion is introduced through additional stranding, and wherein a reverse rotation compensates for the torsion.

7. The device according to claim 1, characterized in that the two stranded conductors are embedded together in a profile made of an insulating material and that they are arranged at a fixed distance from each other.

8. The device according to claim 1, characterized in that each stranded conductor is designed as a coaxial conductor.

9. The device according to claim 1, characterized in that the two stranded conductors are surrounded by a common shielding.

10. Supply line comprising a sensor line for measurement of torsion of the supply line, wherein the torsion is determined based on an electrical parameter of the sensor line and the sensor line comprises two stranded conductors that are stranded in mutually opposite impact directions, and wherein a measuring unit is connected to the sensor line and designed to measure a signal attenuation for each stranded conductor.

11. Sensor line for measurement of torsion of the sensor line, wherein the torsion is determined based on an electrical parameter of the sensor line and the sensor line comprises two stranded conductors that are stranded in mutually opposite impact directions, and wherein a measuring unit is connected to the sensor line and designed to measure a signal attenuation for each stranded conductor.

12. Method for measurement of torsion of a sensor line comprising first and second stranded conductors that are stranded in mutually opposite impact directions, the method comprising:
feeding a first test signal into the first stranded conductor of the sensor line;
measuring a first signal attenuation of the first test signal after the first test signal propagates through the first stranded conductor;
feeding a second test signal into the second stranded conductor of the sensor line;
measuring a second signal attenuation of the second test signal after the second test signal propagates through the second stranded conductor;
determining a difference between the first and second signal attenuations; and
determining the torsion of the sensor line based on the difference.

13. The device according to claim 3, wherein each test signal has a frequency in the range of 10 MHz to 100 MHz.

* * * * *